US012717839B2

(12) United States Patent
Kim

(10) Patent No.: US 12,717,839 B2
(45) Date of Patent: Aug. 25, 2026

(54) IMAGE SEARCH DEVICE AND METHOD

(71) Applicant: HANWHA VISION CO., LTD., Seongnam-si (KR)

(72) Inventor: Dong Won Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 35 days.

(21) Appl. No.: 18/823,218

(22) Filed: Sep. 3, 2024

(65) Prior Publication Data

US 2025/0013689 A1 Jan. 9, 2025

Related U.S. Application Data

(63) Continuation of application No. PCT/KR2023/004716, filed on Apr. 7, 2023.

(30) Foreign Application Priority Data

Apr. 14, 2022 (KR) ........................ 10-2022-0046359

(51) Int. Cl.
*G06F 16/00* (2019.01)
*G06F 3/0482* (2013.01)
(Continued)

(52) U.S. Cl.
CPC ............ *G06F 16/54* (2019.01); *G06F 3/0482* (2013.01); *G06F 16/538* (2019.01)

(58) Field of Classification Search
None
See application file for complete search history.

(56) References Cited

U.S. PATENT DOCUMENTS

2007/0214123 A1 9/2007 Messer et al.
2021/0326646 A1* 10/2021 Gultekin ................ G06V 10/82
2022/0198779 A1* 6/2022 Saraee ................ G06F 16/9536

FOREIGN PATENT DOCUMENTS

KR 10-0670605 B1 1/2007
KR 10-2017853 B1 9/2019
(Continued)

OTHER PUBLICATIONS

Yee, K.-P., Swearingen, K., Li, K., & Hearst, M. (2003). "Faceted Metadata for Image Search and Browsing". Proceedings of the SIGCHI Conference on Human Factors in Computing Systems, pp. 401-408. https://doi.org/10.1145/642611.642681.
(Continued)

*Primary Examiner* — Tuankhanh D Phan
(74) *Attorney, Agent, or Firm* — Sughrue Mion, PLLC

(57) ABSTRACT

An image search device includes at least one processor and at least one memory storing instructions, where, by executing instructions stored on the at least one memory, the at least one processor is configured to: receive a plurality of images and a plurality of metadata from a plurality of camera devices through a communication interface; receive an object search command and a property search command inputted by a user; extract objects corresponding to the object search command based on the plurality of metadata, and extract properties of the extracted objects; generate a search interface including a property search menu which displays a list of the extracted properties for selection through the property search command; and display the generated search interface, where, based on the object search command being changed, the properties displayed in the property search menu are changed in the search interface according to the changed object search command.

20 Claims, 10 Drawing Sheets

(51) Int. Cl.
*G06F 16/538* (2019.01)
*G06F 16/54* (2019.01)

(56) References Cited

FOREIGN PATENT DOCUMENTS

| | | | |
|---|---|---|---|
| KR | 10-2254037 | B1 | 5/2021 |
| KR | 10-2022-0037696 | A | 3/2022 |

OTHER PUBLICATIONS

Extended European Search Report issued Jun. 10, 2025 by the European Patent Office for EP Patent Application No. 23788538.9.

* cited by examiner

Figure 5:
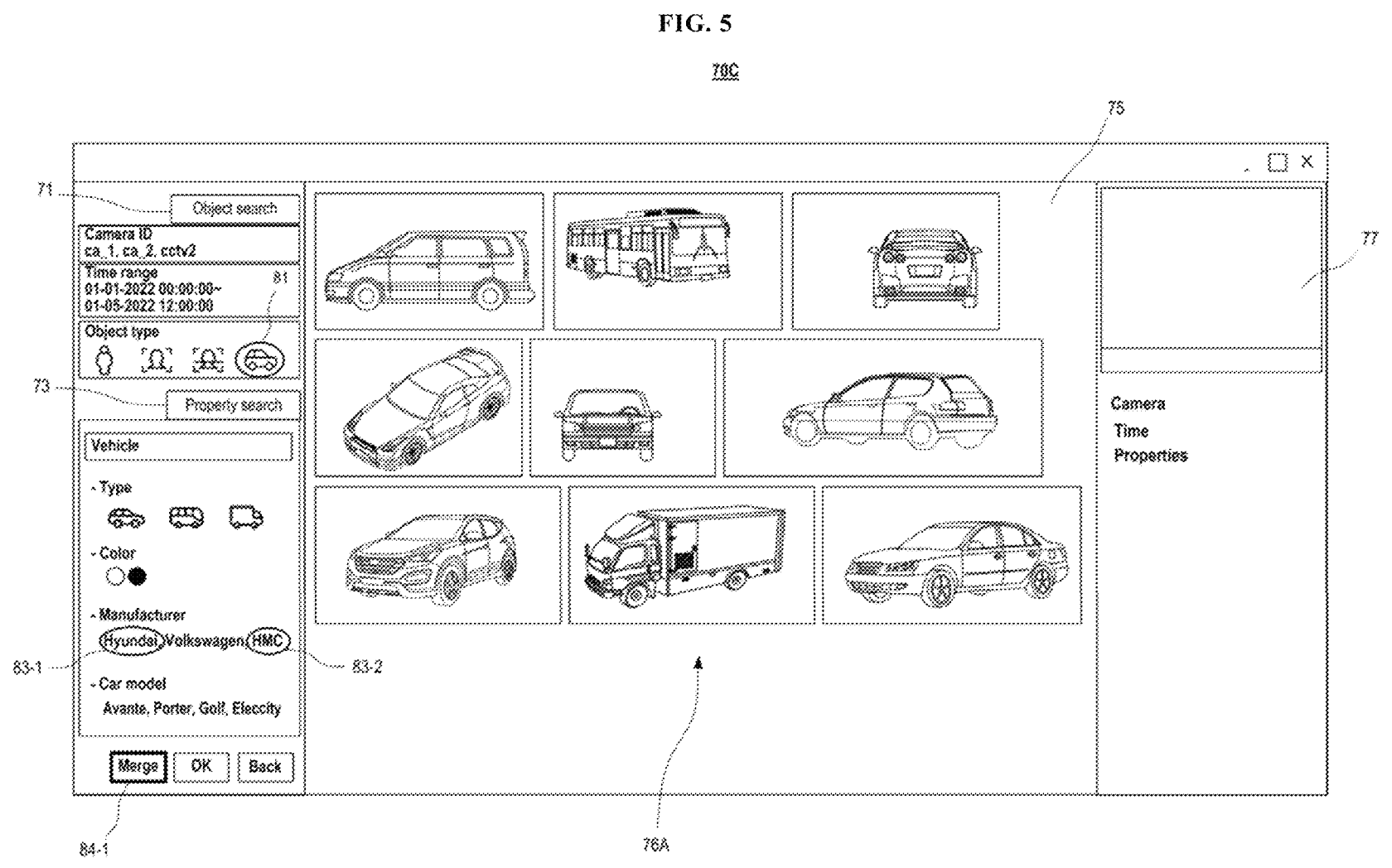

Object search
Camera ID
ca_1, ca_2, cctv2
Time range
01-01-2022 00:00:00~
01-05-2022 12:00:00
Object type
Property search
Vehicle
- Type
- Color
- Manufacturer
Hyundai Volkswagen HMC
- Car model
Avante, Porter, Golf, Elecity
Merge
OK
Back
Camera
Time
Properties
71
73
75
76A
77
81
83-1
83-2
84-1

Figure 7:
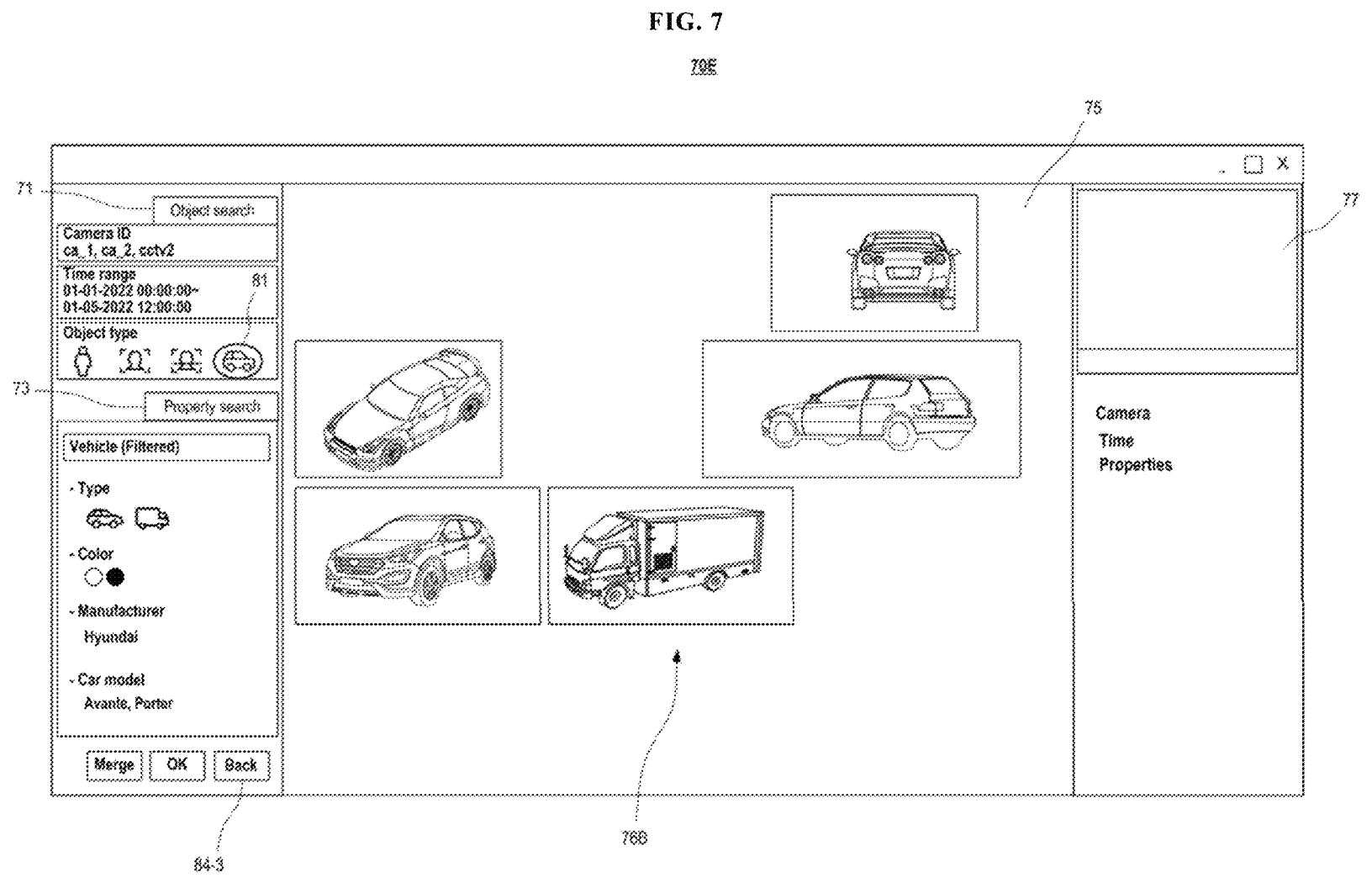

Camera
Time
Properties

76B

71

Camera ID
ca_1, ca_2, cctv2
Time range
01-01-2022 00:00:00~
01-05-2022 12:00:00
Object type Object search

81

73

Property search

Vehicle (Filtered)

- Type
- Color
- Manufacturer
Hyundai
- Car model
Avante, Porter

Merge OK Back 84-3

IMAGE SEARCH DEVICE AND METHOD

CROSS-REFERENCE TO RELATED APPLICATION(S)

This application is a continuation of International Application No. PCT/KR2023/004716, filed on Apr. 7, 2023, in the Korean Intellectual Property Receiving Office, which is based on and claims priority to Korean Patent Application No. 10-2022-0046359, filed on Apr. 14, 2022, in the Korean Intellectual Property Office, the disclosures of which are incorporated by reference herein in their entireties.

BACKGROUND

1. Field

The present disclosure relates to an image search device and method, and more particularly, to an image search device and method which reduces user fatigue and improves search intuitiveness and processing when searching for images obtained from various types of cameras.

2. Description of Related Art

Closed-circuit television (CCTV) that can analyze objects may have the function of storing metadata that distinguish properties of objects in addition to image data when collecting the image data. These metadata may be used by a user to search for image data and may also be used to generate an alarm through an application by triggering an event.

However, conventional artificial intelligence (AI)-based image data search technology lists all search conditions supported by the specifications of a plurality of camera devices regardless of the content of collected data at the stage of receiving a search command from a user and displays them to the user. Here, the longer the list of search conditions, the more time it takes for a search device to perform a user's desired search, causing delays or inefficiencies in the search device.

According to the above conventional technology, a user first selects a camera device to search and a date and time to search. In addition, the user selects detailed properties from filtering items and then enters a search command. Accordingly, an image search device performs a search according to the search command and displays search results to the user.

However, since the conventional image search device displays no results if a specific filtering condition specified by the user does not exist in the collected data, the user has to inconveniently modify the search condition and perform a re-search.

In particular, this problem is further aggravated when more than dozens of filtering properties or attributes of a search target must be provided in an object analysis-based image data search. That is, if all the filtering items and properties (detailed condition settings) that can be supported in a graphic user interface (GUI) are listed, too many elements may be shown in the GUI. Therefore, it inevitably takes a lot of time for a user to set filtering and perform a re-search.

SUMMARY

Provided is an image search device configured to enable a search device to perform a search and obtain desired image search results more quickly and intuitively by implementing a variable filtering menu, from which filtering items and properties that will not be searched for in stored data have been removed, during searching/filtering.

However, aspects of the present disclosure are not restricted to the one set forth herein. The above and other aspects of the present disclosure will become more apparent to one of ordinary skill in the art to which the present disclosure pertains by referencing the detailed description, or may be learned by practice of the presented embodiments.

According to an aspect of the disclosure, an image search device includes at least one processor and at least one memory storing instructions, where, by executing the instructions stored on the at least one memory, the at least one processor may be configured to: receive a plurality of images and a plurality of metadata from a plurality of camera devices through a communication interface; receive an object search command and a property search command inputted by a user; extract objects corresponding to the object search command based on the plurality of metadata, and extract properties of the extracted objects; generate a search interface including a property search menu which displays a list of the extracted properties for selection through the property search command; and display the generated search interface, and where, based on the object search command being changed, the properties displayed in the property search menu are changed in the search interface according to the changed object search command.

The at least one processor may be further configured to: read the plurality of received metadata in a prescribed format; and store the plurality of received images and the plurality of read metadata in a storage medium.

The object search command may include device identifiers of one or more camera devices among the plurality of camera devices, a time range, and a type of object.

The type of object may include one or more of: a person, a recognized face, an unrecognized face, and a vehicle.

A camera device among the plurality of camera devices may be configured with an artificial intelligence (AI)-based video analytics function, and another camera device among the plurality of camera devices may not be configured with the AI-based video analytics function.

Characteristics of the plurality of camera devices may be different, where properties of objects are independently extracted by each camera device.

The search interface may include a merge button configured to merge one or more properties, which are named differently in the plurality of camera devices, into a single property.

The search interface may further include a thumbnail area displaying a plurality of thumbnail images corresponding to the plurality of images.

Based on the user selecting at least one of the properties displayed in the property search menu through the property search command, only thumbnail images corresponding to the at least one selected property among the plurality of thumbnail images may be displayed in the thumbnail area.

Based on the user selecting at least one of the properties displayed in the property search menu through the property search command, the property search menu may change to display only the at least one selected property.

The search interface may further include an image playback area which plays back and displays an image corresponding to a thumbnail image selected by the user among the plurality of thumbnail images.

Based on an image being played back in the image playback area, text information related to an object included in the image is displayed with the image being played back.

According to an aspect of the disclosure, an image search method performed by instructions in an image search device which has a processor and a memory storing the instructions executable by the processor, the image search method may include: receiving a plurality of images and a plurality of metadata from a plurality of camera devices; receiving an object search command and a property search command from a user; extracting objects corresponding to the object search command from the plurality of metadata and extracting properties of the extracted objects; generating a search interface including a property search menu which displays a list of the extracted properties for selection through the property search command; and displaying the generated search interface, and where, based on the object search command being changed, the properties displayed in the property search menu are changed in the search interface according to the changed object search command.

The image search method may further include: reading the plurality of received metadata in a prescribed format; and storing the plurality of images and the plurality of read metadata.

The object search command may include device identifiers of one or more camera devices among the plurality of camera devices, a time range, and a type of object.

The type of the object may include at least one of: a person, a recognized face, an unrecognized face, and a vehicle.

A camera device among the plurality of camera devices may be configured with an AI-based video analytics function, and another camera device among the plurality of camera devices may not be configured with the video analytics function.

At least some characteristics of images supported by the plurality of camera devices are different, where properties of objects are independently captured by each camera device.

According to an aspect of the disclosure, a video surveillance system may include: a plurality of camera devices; and an image search device operatively connected to the plurality of camera devices through a network, where the image search device includes at least one processor and at least one memory storing instructions, where, by executing the instructions stored on the at least one memory, the at least one processor is configured to: receive a plurality of images and a plurality of metadata from the plurality of camera devices through a communication interface; receive an object search command according to a user input; extract objects corresponding to the object search command based on the plurality of metadata and extract properties of the extracted objects; display a search interface including a property search menu which lists the extracted properties through the property search command; and receive a property search command according to a user input selecting at least one extracted property listed in the property search menu, and where, based on the object search command being changed, the properties displayed in the property search menu are changed in the search interface according to the changed object search command.

A camera device among the plurality of camera devices may be configured with an AI-based video analytics function, and another camera device among the plurality of camera devices may not be configured with the video analytics function.

At least some characteristics of images supported by the plurality of camera devices are different, where properties of objects are independently captured by each camera device.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4 illustrates a state in which a property search menu and thumbnail images are displayed after the user performs the object search in a search interface according to an embodiment of the present disclosure;

FIG. 5 illustrates a process in which a user merges duplicate properties displayed in a search interface according to an embodiment of the present disclosure;

FIG. 7 illustrates a state in which a property search menu is changed by properties selected by a user in a search interface according to an embodiment of the present disclosure;

DETAILED DESCRIPTION

Figure 1:
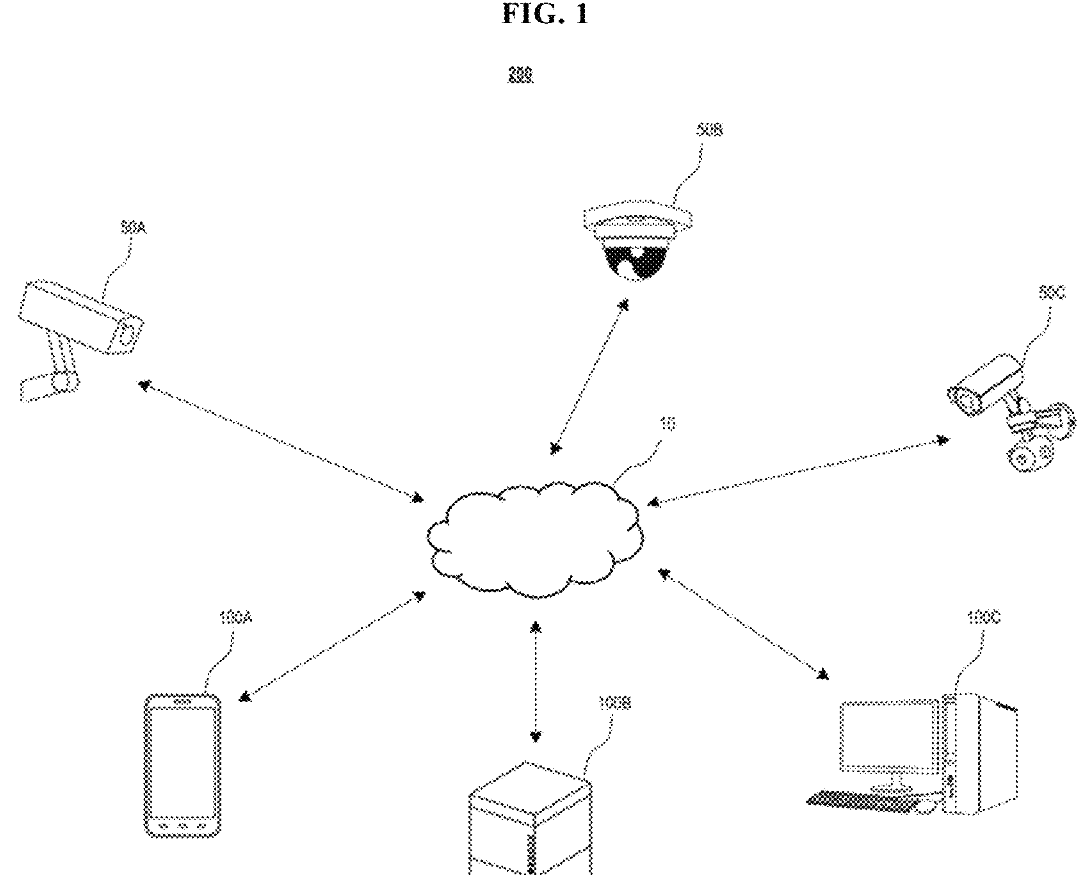
FIG. 1 illustrates a configuration of a video surveillance system according to an embodiment of the present disclosure.

Advantages and features of the disclosure and methods to achieve them will become apparent from the descriptions of exemplary embodiments herein below with reference to the accompanying drawings. However, the embodiments described herein are example embodiments, and thus, the disclosure is not limited thereto and may be realized in various other forms. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms may include plural forms as well, unless the context clearly indicates otherwise. Throughout this specification, the words "includes," "comprises," "has," "having," "including," "comprising," and the like should be understood to specify the presence of stated features, figures, steps, operations, components, members, or combinations thereof, but do not preclude the presence or addition of one or more other features, figures, steps, operations, components, members, or combinations thereof.

Hereinafter, exemplary embodiments of the present disclosure will be described in detail with reference to the accompanying drawings.

FIG. 1 illustrates a configuration of a video surveillance system 200 according to an embodiment of the present disclosure. According to FIG. 1, the video surveillance system 200 may include a plurality of camera devices 50 (50A, 50B and 50C) and various types of image search devices 100 (100A, 100B and 100C), which may be connected to each other through a network 10 such as the Internet or an intranet.

An image search device 100 may be implemented as, for example, a personal computer 100C or a mobile terminal 100A and may also be implemented as a computing device 100B integrated with a network video recorder (NVR). The image search device 100 may be connected to the camera devices 50 through the network 10 based on an Internet protocol and may receive captured images and metadata obtained by applying artificial intelligence (AI)-based video analytics to the images from the camera devices 50. In the present disclosure, the term "image" should be understood to include video, still images, and discontinuous moving images such as MJPEG, and the like.

The camera devices 50 may include a camera device having an AI-based video analytics function as a network camera that captures images and a camera device not having the function. Here, the camera device not having the video analytics function can function in the same way as the camera device having the video analytics function by being linked to a separate video analytics device.

Figure 2:
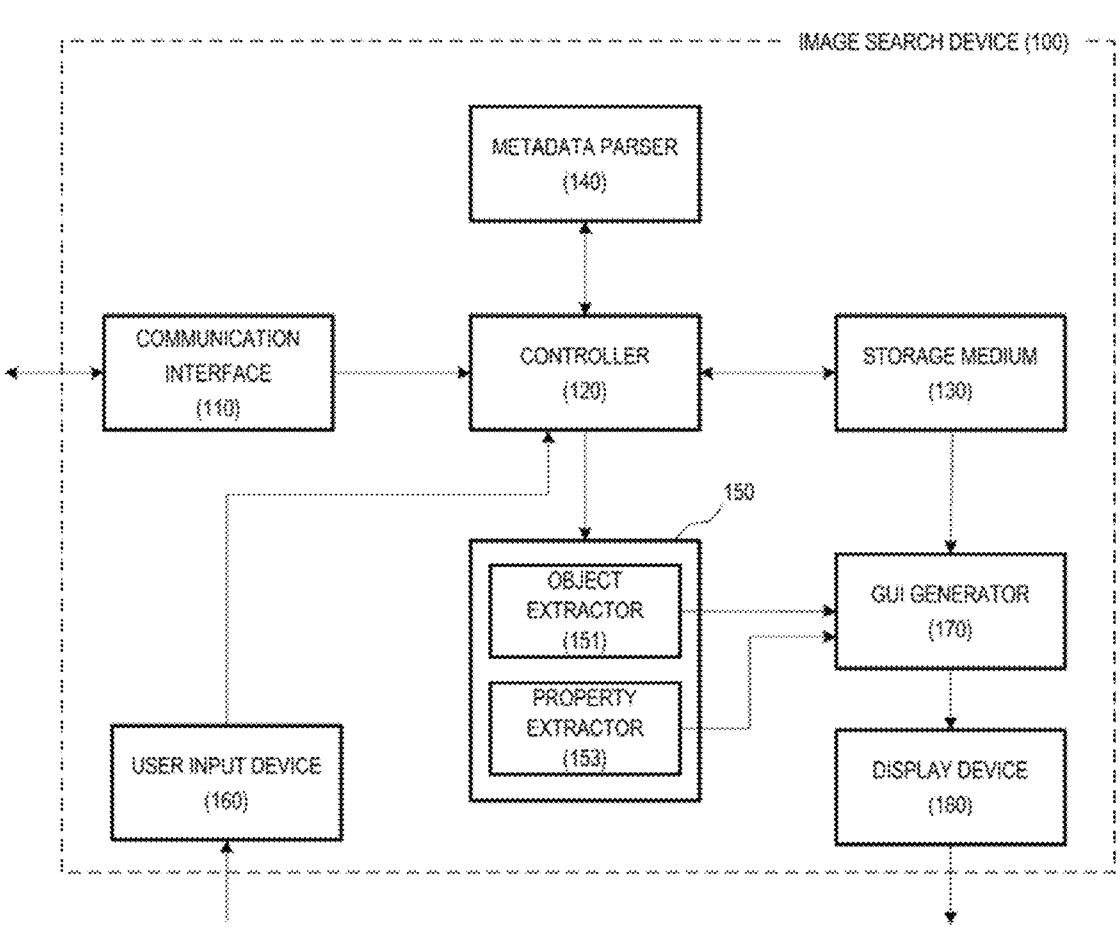
FIG. 2 illustrates a configuration of an image search device according to an embodiment of the present disclosure.

FIG. 2 is a block diagram of an image search device 100 according to an embodiment of the present disclosure. The image search device 100 may include a computing device having a processor and a memory that stores instructions executable by the processor. The image search device 100 may include a communication interface 110, a metadata extractor 150, a user input device 160 and a graphic user interface (GUI) generator 170 and may further include a controller 120, a storage medium 130, a metadata parser 140 and a display device 180.

The controller 120 of FIG. 2 may be a processor such as a CPU, a microcomputer, an ECU or a GPU and may control the overall operations of other blocks within the image search device 100.

The communication interface 110 may request the camera devices 50 for data and receive a plurality of images and a plurality of metadata from the camera devices 50 as a response. To this end, the communication interface 110 may include a physical communication interface which transmits and receives data to and from other devices through a wired/wireless communication medium based on a communication protocol of a set rule. In general, metadata refers to objects (people, cars, animals, etc.) included in a specific image and text data obtained through video analysis of various properties (size, motion, gender, color, detailed model, etc.) of the objects, and other data associated with image data.

The received images and metadata may be stored in the storage medium 130. The storage medium 130 may be implemented as one or more memory media such as random-access memory (RAM), read-only memory (ROM), hard disk, solid state drive (SSD), and memory card.

The user input device 160 may include a device that receives an object search command and a property search command from a user, and may be implemented in various forms such as a keyboard, a mouse, a digitizer, an electronic pen, a touch pad, or a touch panel, but is not limited thereto. The object search command may include at least the type of object and may further include device identifiers of the camera devices and a time range for image search. That is, the user may set a range for searching for a desired object through the object search command. The range may include a spatial range of camera devices and a temporal range of date/time.

In addition, the property search command may refer to a command for searching for specific properties of an object within the above range. In the present disclosure, the object search command may determine the type and range of an object, and detailed properties may be determined by the property search command. Therefore, in some examples, the present disclosure may have a dual search structure.

The metadata extractor 150 may include an object extractor 151 which extracts objects corresponding to the object search command from the metadata and a property extractor 153 which extracts detailed properties of the objects. To this end, the metadata extractor 150 may be linked to the metadata parser 140 which reads the received metadata in a prescribed format.

The GUI generator 170 may generate a search interface 70A (see FIG. 3) including a property search menu 73 (see FIG. 3) which lists and displays the extracted properties so that a user can select at least one of the extracted properties through the property search command. In addition, the GUI generator 170 may provide the generated search interface 70 to the user through the display device 180. The display device 180 may be implemented as a known conventional display medium such as a liquid crystal display (LCD), an organic light-emitting diode (OLED), a plasma panel display (PDP), or a quantum dot, but is not limited thereto.

According to an embodiment of the present disclosure, when the object search command is changed, the properties included in the property search menu 73 may also be dynamically changed and displayed accordingly in the search interface 70. That is, when the type of object, camera device, and time range selected by a user is changed, the configuration of the property search menu 73 itself included in the search interface 70 may also be changed.

On the other hand, in the conventional art, a list of all properties or attributes supported by an image search device is displayed to a user, and the image search device searches for a desired property from a list, according to a user input. Therefore, since properties that do not exist in objects from an actual target camera device or within a search time range are also displayed in a menu, it is not only difficult for the search device to perform an intuitive search, but it results in cases in which no search results are displayed for searches that select such non-existent properties.

The present disclosure avoids such shortcomings. A process in which a user performs an image search using a search interface 70 according to an embodiment of the present disclosure will now be described in detail with reference to FIGS. 3 through 8.

Figure 3:
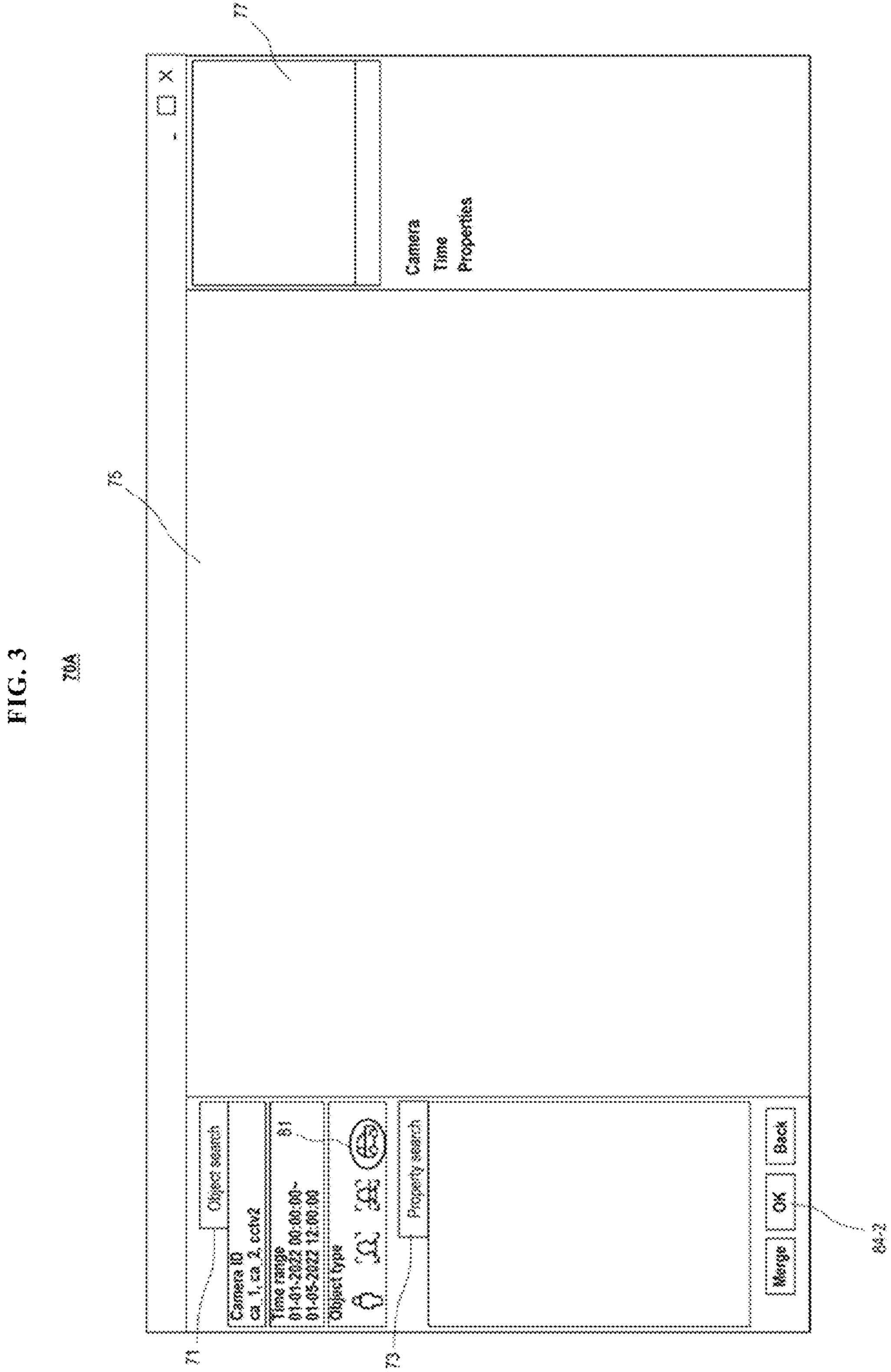
FIG. 3 illustrates a process in which a user performs an object search through an object search menu in a search interface according to an embodiment of the present disclosure.

FIG. 3 illustrates a process in which a user performs an object search through an object search menu 71 in a search interface 70A according to an embodiment of the present disclosure.

The search interface 70A may include the object search menu 71 and a property search menu 73. A user may enter an object search command through the object search menu 71 and enter a property search command through the property search menu 73.

The object search command may include device identifiers (Camera ID) of the camera devices, a time range (Time range) for an image search, and types of the objects (Object type). Referring to the example illustrated in FIG. 3, through the object search command, the user can specify three camera devices including ca_1, ca_2 and cctv2 as device identifiers (Camera ID), set "from midnight on Jan. 1, 2022 to noon on Jan. 5, 2022" as a time range, and select a vehicle 81 from four object types. In an embodiment, the object types may be expressed by icons representing a person, a recognized face, an unrecognized face, and a vehicle in this order.

In addition, the search interface 70A may further include, for example, at a central location, a thumbnail area 75 which displays a plurality of thumbnail images 76A (see FIG. 4) corresponding to the images. In the example of FIG. 3, the user has only entered items for object search and has not yet pressed an OK button 84-2 (has not yet entered the object search command). Therefore, the thumbnail images may not be displayed in the thumbnail area 75.

In addition, the search interface 70A may further include, for example, at an upper right location, an image playback area 77 which plays back and displays an image corresponding to a thumbnail image specified by the user.

Figure 4:
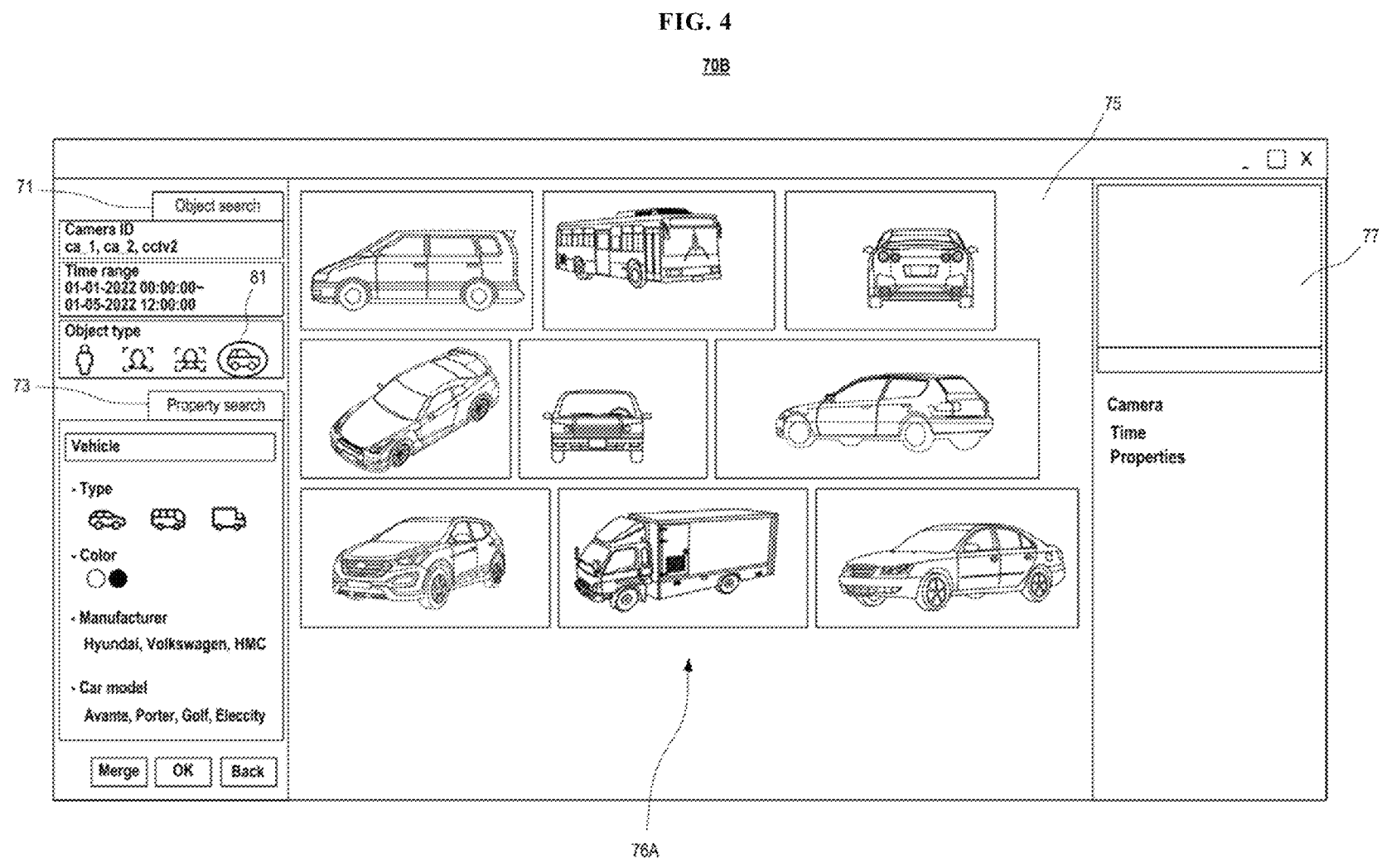

FIG. 4 illustrates a state in which the property search menu 73 and the thumbnail images 76A are displayed after the user performs an object search in the search interface 70B according to the embodiment of the present disclosure. When the user presses the OK button 84-2 in the search interface 70A of FIG. 3, the object search command may be executed, and the search interface 70B as shown in FIG. 4 may be displayed on the display device 180.

Here, characteristics of images supported by the camera devices 50 and items of properties of the objects may be different for each camera device. The characteristics of the images may refer to the size, resolution, aspect ratio, etc. of the images which are different for each camera device. As shown in FIG. 4, sizes and aspect ratios of the thumbnail images 76A may be different from each other.

In addition, since each camera device has different criteria for classifying properties, the same properties may be expressed differently, and similar objects that are difficult to distinguish may be included together. Table 1 below illustrates an example which shows that three camera device manufacturers (H, F, and P) are different in the number of items, classification criteria, and names of vehicle type and vehicle color. For example, H's Motorcycle and F's Bike are different expressions although they are the same properties, and F does not have a property called Bicycle, unlike other manufacturers. In addition, P only provides vehicle type as a property and does not provide a vehicle color property. If all properties that are different for each camera device manufacturer are displayed, it would be difficult for the electronic device to perform an accurate search.

TABLE 1

| Camera device | Property | |
|---|---|---|
| manufacturers | Vehicle type | Vehicle color |
| Company H | Undefined<br>Car (Sedan, SUV)<br>Truck<br>Bus<br>Motorcycle<br>Bicycle | Black<br>Gray<br>White<br>Red<br>Orange<br>Yellow<br>Green<br>Blue<br>Magenta |
| Company F | Undefined<br>Car<br>SUV<br>Van<br>LCV<br>Truck<br>Bus<br>Bike | Beige<br>Black<br>Blue<br>Brown<br>Gray<br>Green<br>Orange<br>Red<br>White<br>Yellow<br>Silver |
| Company P | Passenger<br>Van<br>SUV<br>Truck<br>Bus<br>Bicycle | None |

The search interface 70B illustrated in FIG. 4 may display the property search menu 73 composed only of properties belonging to an object set by the user through the object search command. Therefore, the user may perform an additional search using a property that exists (the property search menu 73) or can monitor an image using the currently displayed results.

The property search menu 73 of FIG. 4 may include a vehicle type property (-Type) including "passenger car, bus and truck", a vehicle color property (-Color) including "white and black", a manufacturer property (-Manufacturer) including "Hyundai™, Volkswagen and HMC", and a vehicle model property (-Car model) including "Avante, Porter, Golf and Eleccity". In addition, the thumbnail images 76A that satisfy the properties included in the property search menu 73 may be listed in the thumbnail area 75.

FIG. 5 illustrates a process in which the user merges duplicate properties displayed in the search interface 70C according to an embodiment of the present disclosure. As described above, the manufacturer property (-Manufacturer) including "Hyundai, Volkswagen and HMC" may be displayed in the illustrated property search menu 73. However, Hyundai and HMC (abbreviation) are actually the same manufacturer and differ only in the way they are expressed. The user may want these identical properties to be expressed with a representative name and displayed as only one integrated property in the future.

Accordingly, if the user selects both Hyundai and HMC and then presses a merge button 84-1, such properties may be merged and displayed as a single property in the future. Here, one of the two names may be used as a representative name, but a property selected first can be adopted. Information about the merging of identical properties expressed differently may be stored in the storage medium 130 in the form of a mapping table for future use.

Figure 6:
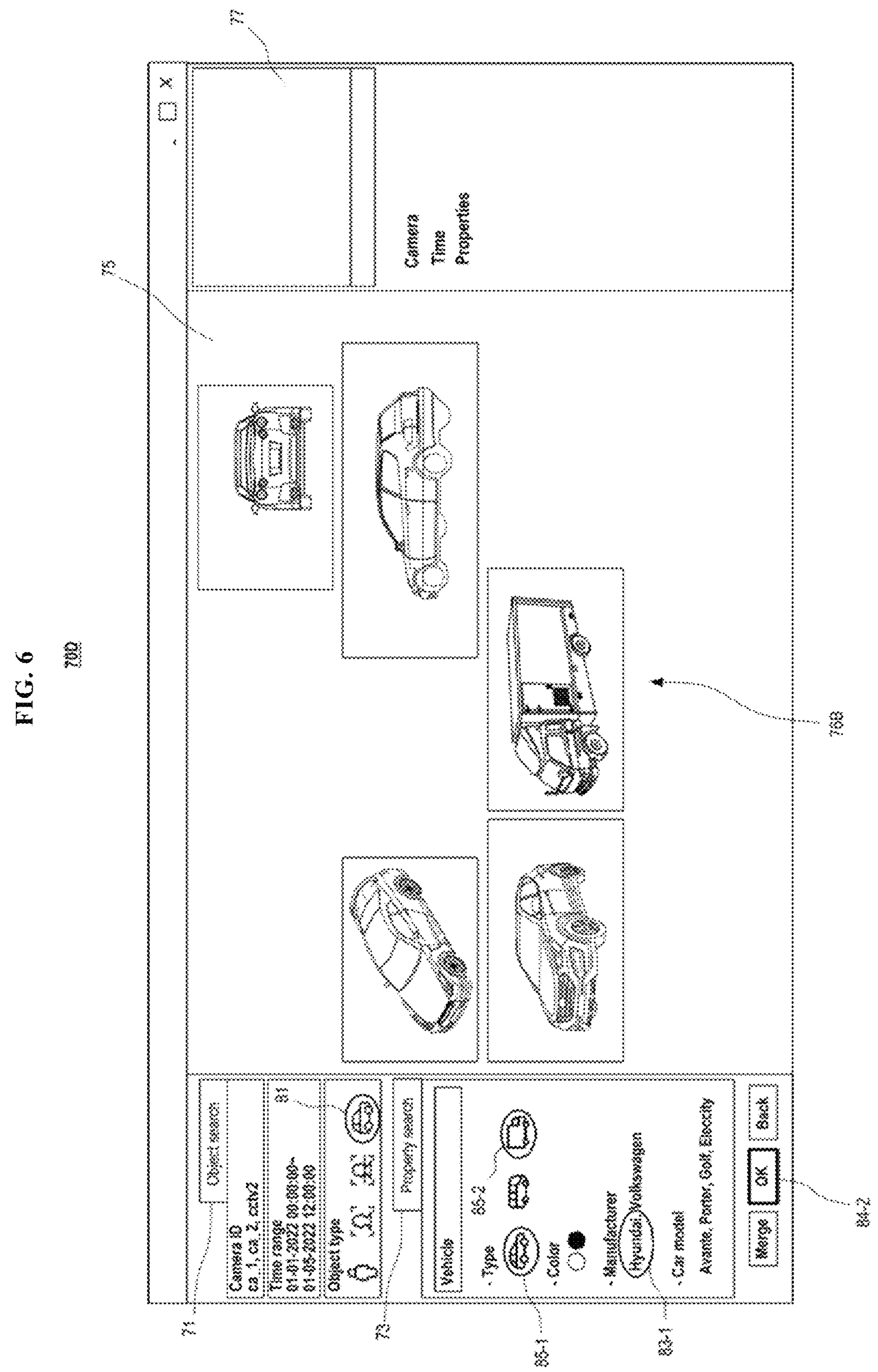
FIG. 6 illustrates a process in which a user selects some of the properties displayed in a property search menu of the search interface according to an embodiment of the present disclosure.

FIG. 6 illustrates a process in which the user selects some of the properties displayed in the property search menu 73 of the search interface 70D according to an embodiment of the present disclosure. When the user selects at least one of the properties displayed in the property search menu 73 through the property search command, only thumbnail images 76B corresponding to the selected property among the thumbnail images 76A may be filtered and displayed in the thumbnail area 75.

Referring to FIG. 6, the user has selected "passenger car and truck" as the vehicle type property (-Type) and "Hyundai" as the manufacturer property (-Manufacturer) in the property search menu 73. In this state, if the user presses the OK button 84-2, only the thumbnail images 76B that satisfy the above property conditions among the nine thumbnail images 76A originally displayed may be displayed in the thumbnail area 75. Here, although the thumbnail images 76B are displayed at their original locations in FIG. 6, the present disclosure is not limited thereto, and the thumbnail images 76B may also be displayed adjacent to each other without a space between them.

As illustrated, in the property search menu 73 of FIG. 6, the vehicle type property (-Type) and the manufacturer property (-Manufacturer) may be selected, and the vehicle color property (-Color) and the vehicle model property (-Car model) may not be selected. However, there may be no inefficiencies in finding and displaying search results. Like this, for detailed property search, the method may allow a user to select a plurality of properties together in the property search menu 73, or properties may be left unselected.

FIG. 7 illustrates a state in which the property search menu 73 is changed by properties selected by the user in the search interface 70E according to an embodiment of the present disclosure. The results of the property search command executed when the user selects the vehicle type property (-Type) and the manufacturer property (-Manufacturer) and presses the OK button 84-2 in FIG. 6 may be displayed in the property search menu 73 in a condensed form with only the properties selected by the user, as shown in FIG. 7.

Figure 8:
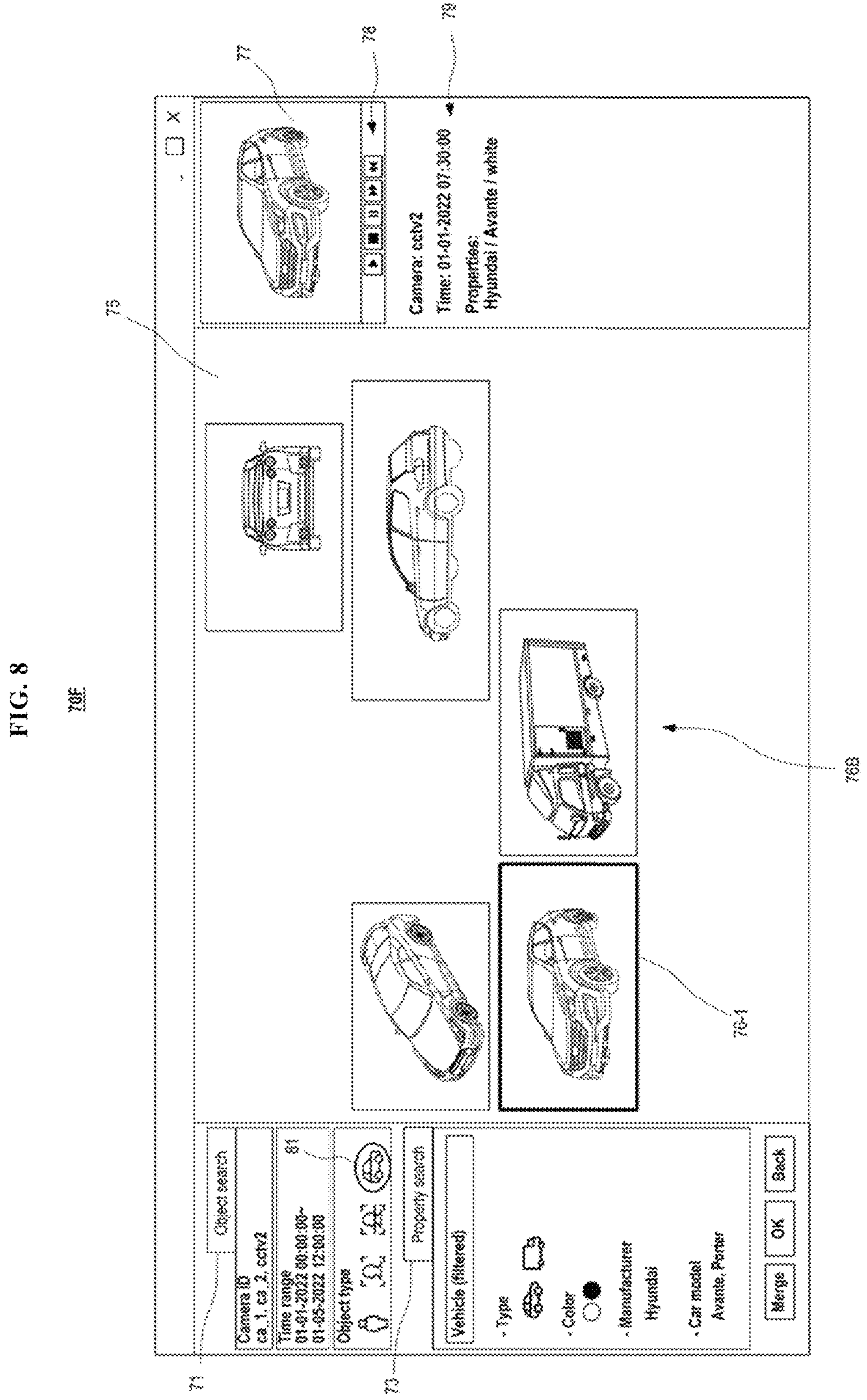
FIG. 8 illustrates a state in which an image corresponding to a thumbnail image is played back when a user selects a thumbnail image in a search interface according to an embodiment of the present disclosure.

FIG. 8 illustrates a state in which an image (video) corresponding to a thumbnail image 76B is played back when the user selects the thumbnail image 76B in the search interface 70F according to an embodiment of the present disclosure. When the user selects any one (76-1) of the thumbnail images 76B displayed in the thumbnail area 75, an image corresponding to the selected thumbnail image 76-1 may be played back in the image playback area 77. For the playback of the image, a playback control box 78 may be displayed at the bottom of the playback area 77, and the user may perform trick play such as play, stop, pause, fast-forward, fast-rewind, and jump through the playback control box 78.

In addition, when the image is played back in the image playback area 77, text information 79 related to an object included in the image may also be displayed together with the image being played back. Referring to FIG. 8, the image being played back was captured by a "cctv2" camera device at "07:30 on Jan. 1, 2022" and that a vehicle included in the image is a "white Avante" model manufactured by "Hyundai."

Figure 9:
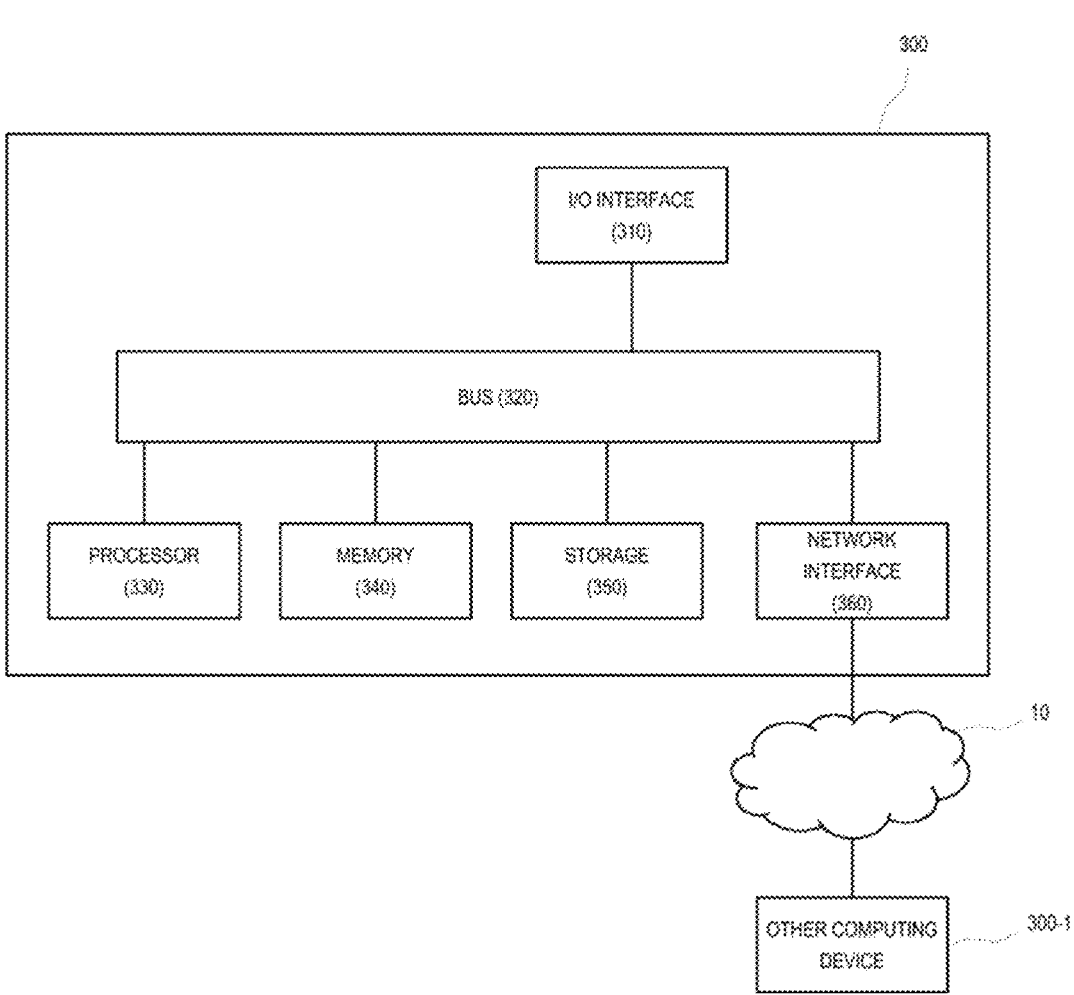
FIG. 9 is a block diagram illustrating a hardware configuration of a computing device that implements an image search device of FIG. 2 according to an embodiment of the present disclosure.

FIG. 9 is a block diagram illustrating the hardware configuration of a computing device 300 that implements the image search device 100 of FIG. 2.

Referring to FIG. 9, a computing device 300 may include a bus 320, a processor 330, a memory 340, a storage 350, an input/output interface 310, and a network interface 360. The bus 320 may include a path for the transmission of data between the processor 330, the memory 340, the storage 350, the input/output interface 310, and the network interface 360. However, the present disclosure may not limit how the processor 330, the memory 340, the storage 350, the input/output interface 310, and the network interface 360 are connected. The processor 330 may include an arithmetic processing unit such as a central processing unit (CPU) or a graphics processing unit (GPU). The memory 340 may include a memory such as a random-access memory (RAM) or a read-only memory (ROM). The storage 350 is a storage device such as a hard disk, a solid state drive (SSD), or a memory card. The storage 350 may also be a memory such as a RAM or a ROM. Although represented by individual blocks in FIG. 9, the present disclosure is not limited thereto. For instance, the processor 330 may be implemented by one or more processors; the memory 340 may be implemented by one or more memories, etc.

The input/output interface 310 may include an interface for connecting the computing device 300 and an input/output device. For example, a keyboard or a mouse may be connected to the input/output interface 310.

The network interface 360 may include an interface for communicatively connecting the computing device 300 and an external device to an exchange transport packet with each other. The network interface 360 may be a network interface for connection to a wired line or for connection to a wireless line. For example, the computing device 300 may be connected to another computing device 300-1 via a network 10.

The storage 350 stores program modules that implement the functions of the computing device 300. The processor 330 may implement the functions of the computing device 300 by executing the program modules. Here, the processor 330 may read the program modules into the memory 340 and may then execute the program modules.

The hardware configuration of the computing device 300 is not particularly limited. For example, the program modules may be stored in the memory 340. In this example, the computing device 300 may not include the storage 350.

The image search device 100 may at least include the processor 330 and the memory 340, which stores instructions that can be executed by the processor 330. The image search device 100 of FIG. 2 may be driven by executing instructions including a variety of functional blocks or steps included in the image search device 100, via the processor 330.

Figure 10:
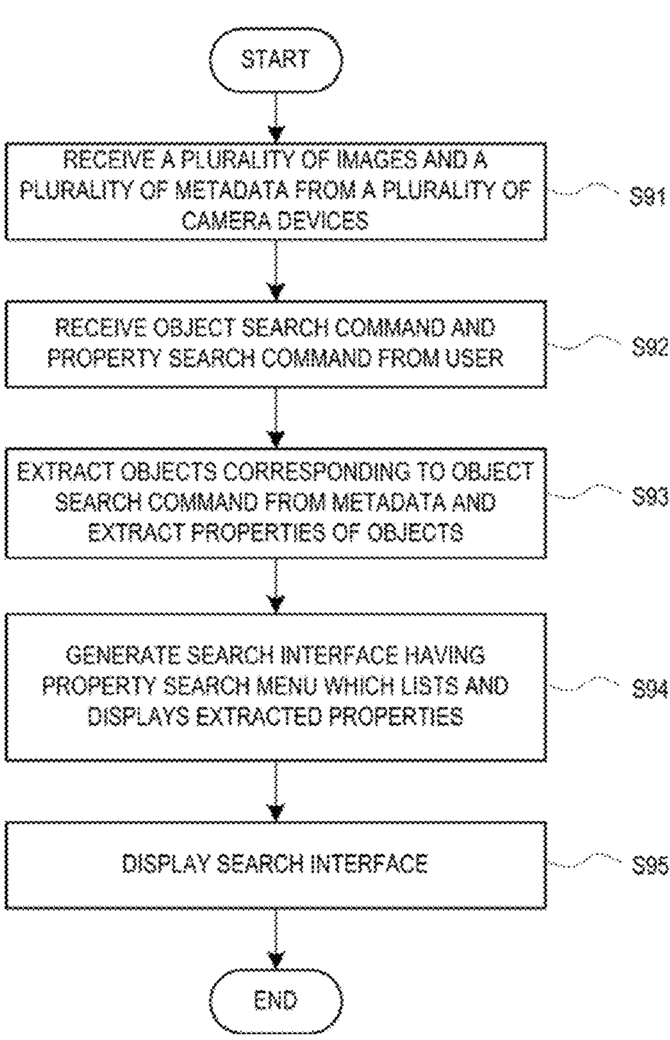
FIG. 10 is a flowchart schematically illustrating an image search method performed by an image search device according to an embodiment of the present disclosure.

FIG. 10 is a flowchart schematically illustrating an image search method performed by the image search device 100 according to the embodiment of the present disclosure.

First, the communication interface 110 may receive a plurality of images and a plurality of metadata from a plurality of camera devices 50 (operation S91). In addition, the user input device 160 may receive an object search command and a property search command from a user (operation S92).

Next, the metadata extractor 150 may extract objects corresponding to the object search command from the metadata and extracts properties of the extracted objects (operation S93).

The GUI generator 170 may generate a search interface 70 having a property search menu 73 which lists and displays the extracted properties so that the user can select at least one of the extracted properties through the property search command (operation S94).

Then, the generated search interface 70 may be displayed to the user through the display device 180 (operation S95).

Here, when the object search command (device identifiers of the camera devices, a time range for image search, types of the objects, etc.) is changed by the user, the properties included in the property search menu 73 may be dynamically changed and displayed accordingly in the search interface 70.

According to the present disclosure, after an object search is performed, a property search menu that includes only properties of a found object may be variably configured.

Then, a user may perform a property search in the property search menu with a reduced number of properties. Therefore, it may be possible to increase efficiency of a search device by reducing an excessive number of irrelevant properties, and improve search intuitiveness.

In addition, since the property search menu is displayed only with property search items stored as metadata in a storage device, there may be an advantage of a minimal number of cases in which search results are not output when a search is performed.

In addition, according to the present disclosure, there is an advantage in that various images provided from a plurality of cameras that are not standardized and have different supportable properties may be searched for in an integrated and systematic manner. The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An image search device comprising at least one processor and at least one memory storing instructions, wherein, by executing the instructions stored on the at least one memory, the at least one processor is configured to:

receive a plurality of images and a plurality of metadata from a plurality of camera devices through a communication interface;

receive an object search command inputted by a user to specify a type of object to be searched;

extract objects corresponding to the object search command based on the plurality of metadata, and extract properties of the extracted objects;

generate a search interface comprising a property search menu which displays a list of the extracted properties for selection through a property search command display the generated search interface; and receive the property search command according to a user input selecting at least one extracted property listed in the property search menu, wherein, when the type of object specified by the object search command is changed from a first object type to a second object type, the property search menu displayed in the generated search interface is updated to replace a first list of properties corresponding to the first object type with a second list of properties corresponding to the second object type, and wherein the first list of properties and the second list of properties differ from each other in at least one of a property category and a number of properties.

2. The image search device of claim 1, wherein the at least one processor is further configured to:

read the plurality of received metadata in a prescribed format; and store the plurality of received images and the plurality of read metadata in a storage medium.

3. The image search device of claim 1, wherein the property search menu facilitates selection of a plurality of properties among the properties listed.

4. The image search device of claim 2, wherein the object search command comprises at least one of: device identifiers of one or more camera devices among the plurality of camera devices, a time range, and the type of the object.

5. The image search device of claim 4, wherein the type of the object comprises one or more of: a person, a recognized face, an unrecognized face, and a vehicle.

6. The image search device of claim 4, wherein a camera device among the plurality of camera devices is configured with an artificial intelligence (AI)-based video analytics function, and another camera device among the plurality of camera devices is not configured with the AI-based video analytics function.

7. The image search device of claim 4, wherein at least some characteristics of images supported by the plurality of camera devices are different, and properties of objects are independently captured by each camera device.

8. The image search device of claim 4, wherein the search interface comprises a merge button configured to merge one or more properties, which are named differently in the plurality of camera devices, into a single property.

9. The image search device of claim 4, wherein the search interface further comprises a thumbnail area displaying a plurality of thumbnail images corresponding to the plurality of images.

10. The image search device of claim 9, wherein, based on the user selecting the at least one of the properties displayed in the property search menu through the property search command, only thumbnail images corresponding to the at least one selected property among the plurality of thumbnail images are displayed in the thumbnail area.

11. The image search device of claim 9, wherein, based on the user selecting the at least one of the properties displayed in the property search menu through the property search command, the property search menu is changed to display only the at least one selected property.

12. The image search device of claim 9, wherein the search interface further comprises an image playback area which plays back and displays an image corresponding to a thumbnail image selected by the user among the plurality of thumbnail images.

13. The image search device of claim 12, wherein, based on an image being played back in the image playback area, text information related to an object included in the image is displayed with the image being played back.

14. An image search method performed by instructions in an image search device which has a processor and a memory storing the instructions executable by the processor, the image search method comprising:

receiving a plurality of images and a plurality of metadata from a plurality of camera devices;

receiving an object search command from a user to specify a type of object to be searched;

extracting objects corresponding to the object search command from the plurality of metadata, and extracting properties of the extracted objects;

generating a search interface comprising a property search menu which displays a list of the extracted properties for selection through a property search command;

displaying the generated search interface; and receiving the property search command according to a user input selecting at least one extracted property listed in the property search menu, wherein, when the type of object specified by the object search command is changed from a first object type to a second object type, the property search menu displayed in the generated search interface is updated to replace a first list of properties corresponding to the first object type with a second list of properties corresponding to the second object type, and wherein the first list of properties and the second list of properties differ from each other in at least one of a property category and a number of properties.

15. The image search method of claim 14, further comprising:

reading the plurality of received metadata in a prescribed format; and storing the plurality of images and the plurality of read metadata.

16. The image search method of claim 14, wherein the property search menu facilitates selection of a plurality of properties among the listed properties.

17. The image search method of claim 15, wherein the object search command comprises device identifiers of one or more camera devices among the plurality of camera devices, a time range, and the type of the object.

18. The image search method of claim 17, wherein the type of the object comprises at least one of: a person, a recognized face, an unrecognized face, and a vehicle.

19. A video surveillance system comprising:

a plurality of camera devices; and an image search device operatively connected to the plurality of camera devices through a network, wherein the image search device comprises at least one processor and at least one memory storing instructions, wherein, by executing the instructions stored on the at least one memory, the at least one processor is configured to:

receive a plurality of images and a plurality of metadata from the plurality of camera devices through a communication interface;

receive an object search command according to a user input to specify a type of object to be searched;

extract objects corresponding to the object search command based on the plurality of metadata, and extract properties of the extracted objects;

display a search interface comprising a property search menu which lists the extracted properties through a property search command; and receive the property search command according to a user input selecting at least one extracted property listed in the property search menu, wherein, when the type of object specified by the object search command is changed from a first object type to a second object type, the property search menu displayed in the search interface is updated to replace a first list of properties corresponding to the first object type with a second list of properties corresponding to the second object type, and wherein the first list of properties and the second list of properties differ from each other in at least one of a property category and a number of properties.

20. The video surveillance system of claim 19, wherein one camera of the plurality of camera devices is configured with an artificial intelligence (AI)-based video analytics function, wherein another camera of the plurality of camera devices is not configured with the AI-based video analytics function, wherein at least some characteristics of images supported by the plurality of camera devices are different, and wherein properties of objects are independently captured by each camera device.

* * * * *